US008292318B2

United States Patent
Lair et al.

(10) Patent No.: US 8,292,318 B2
(45) Date of Patent: Oct. 23, 2012

(54) ADAPTABLE DRAWBAR SUPPORT ASSEMBLY

(75) Inventors: Rodney D. Lair, Cedar Falls, IA (US); Edwin R. Kreis, Waterloo, IA (US); Michael C. Harting, LaPort City, IA (US); Michael D. Kollath, Dunkerton, IA (US)

(73) Assignee: Deere & Company, Moline, IL (US)

( * ) Notice: Subject to any disclaimer, the term of this patent is extended or adjusted under 35 U.S.C. 154(b) by 261 days.

(21) Appl. No.: 12/683,100

(22) Filed: Jan. 6, 2010

(65) Prior Publication Data
US 2010/0109288 A1     May 6, 2010

Related U.S. Application Data

(63) Continuation-in-part of application No. 11/748,691, filed on May 15, 2007, now Pat. No. 7,717,454.

(51) Int. Cl.
*B60D 1/30* (2006.01)
(52) U.S. Cl. ........ 280/504; 280/506; 280/515; 280/493; 280/495
(58) Field of Classification Search .................. 280/495, 280/504, 506, 515, 493
See application file for complete search history.

(56) References Cited

U.S. PATENT DOCUMENTS

| | | | | |
|---|---|---|---|---|
| 2,873,982 A * | 2/1959 | Graham | ...................... | 280/478.1 |
| 2,947,551 A * | 8/1960 | Reimers | ........................ | 280/499 |
| 3,447,816 A * | 6/1969 | Shannon | ....................... | 280/452 |
| 4,092,035 A * | 5/1978 | Warner | ........................ | 280/446.1 |
| 4,192,524 A * | 3/1980 | Twiestmeyer | ............... | 280/416.1 |
| 4,317,580 A * | 3/1982 | Scarnato et al. | ........... | 280/415.1 |
| 4,711,461 A * | 12/1987 | Fromberg | ...................... | 280/494 |
| 5,193,838 A * | 3/1993 | Olson | ........................ | 280/515 |
| 5,536,032 A * | 7/1996 | Golson et al. | ................. | 280/515 |
| 6,536,794 B2 * | 3/2003 | Hancock et al. | ............. | 280/511 |
| 6,749,213 B2 * | 6/2004 | Kollath et al. | .............. | 280/455.1 |

* cited by examiner

*Primary Examiner* — Tashiana Adams
*Assistant Examiner* — Michael Stabley

(57) ABSTRACT

The invention relates to a drawbar support assembly. There is a need for a drawbar support assembly which can adapt to different types of drawbars. An adaptable drawbar support assembly includes a generally U-shaped front support member for coupling to and supporting the front end of the drawbar. A front spacer member mounts in the front support member above or below the front end of the drawbar. A generally U-shaped rear support member couples to and supports the drawbar. A rear spacer member mounts in the rear support member below the drawbar. The rear spacer member is removable from the rear support member when the front spacer member is mounted above the front end of the drawbar. A ball coupler is attached to the rear end of the drawbar when the front spacer member is mounted above the front end of the drawbar. A clevis coupler is attached to the rear end of the drawbar when the front spacer member is mounted below the front end of the drawbar.

7 Claims, 4 Drawing Sheets

ADAPTABLE DRAWBAR SUPPORT ASSEMBLY

CROSS REFERENCES TO RELATED APPLICATIONS

This application is a continuation-in-part of U.S. application Ser. No. 11/748,691, entitled "ADAPTABLE DRAWBAR SUPPORT ASSEMBLY", filed 15 May 2007 now U.S. Pat. No. 7,717,454.

FIELD OF THE INVENTION

The present invention relates to an adaptable drawbar support assembly.

BACKGROUND OF THE INVENTION

It is often necessary to attach a variety of different implements to vehicles such as agricultural tractors. For example, some implements must be coupled to a drawbar with a ball-type coupling mechanism. Other implements must be coupled to a drawbar with a clevis-type coupling mechanism. Thus, it is desirable to be able to easily switch or change drawbars which are mounted to a tractor.

SUMMARY OF THE INVENTION

Accordingly, an object of this invention is to provide an adaptable drawbar support assembly for a tractor.

This and other objects are achieved by the present invention, which is an adaptable drawbar support assembly which can accommodate different drawbars having different implement coupling mechanisms at their rear ends. The drawbar support assembly includes a generally U-shaped front support member for coupling to and supporting the front end of a drawbar. A front spacer member is mountable in the front support member above or below the front end of the drawbar. The drawbar support assembly also includes a generally U-shaped rear support member for coupling to and supporting the drawbar, and a rear spacer member. The rear spacer member is removably mountable in the rear support member below the drawbar. The rear spacer member is preferably removed from the rear support member when the front spacer member is mounted above the front end of the drawbar. The drawbar support assembly may receive a drawbar with a ball coupler or a drawbar with a clevis coupler. The rear spacer member includes a base and a pair of blocks which project upwardly from the base and which are spaced apart laterally from each other. The blocks form slot through which extends the drawbar.

DESCRIPTION OF THE PREFERRED EMBODIMENT

Figure 1:
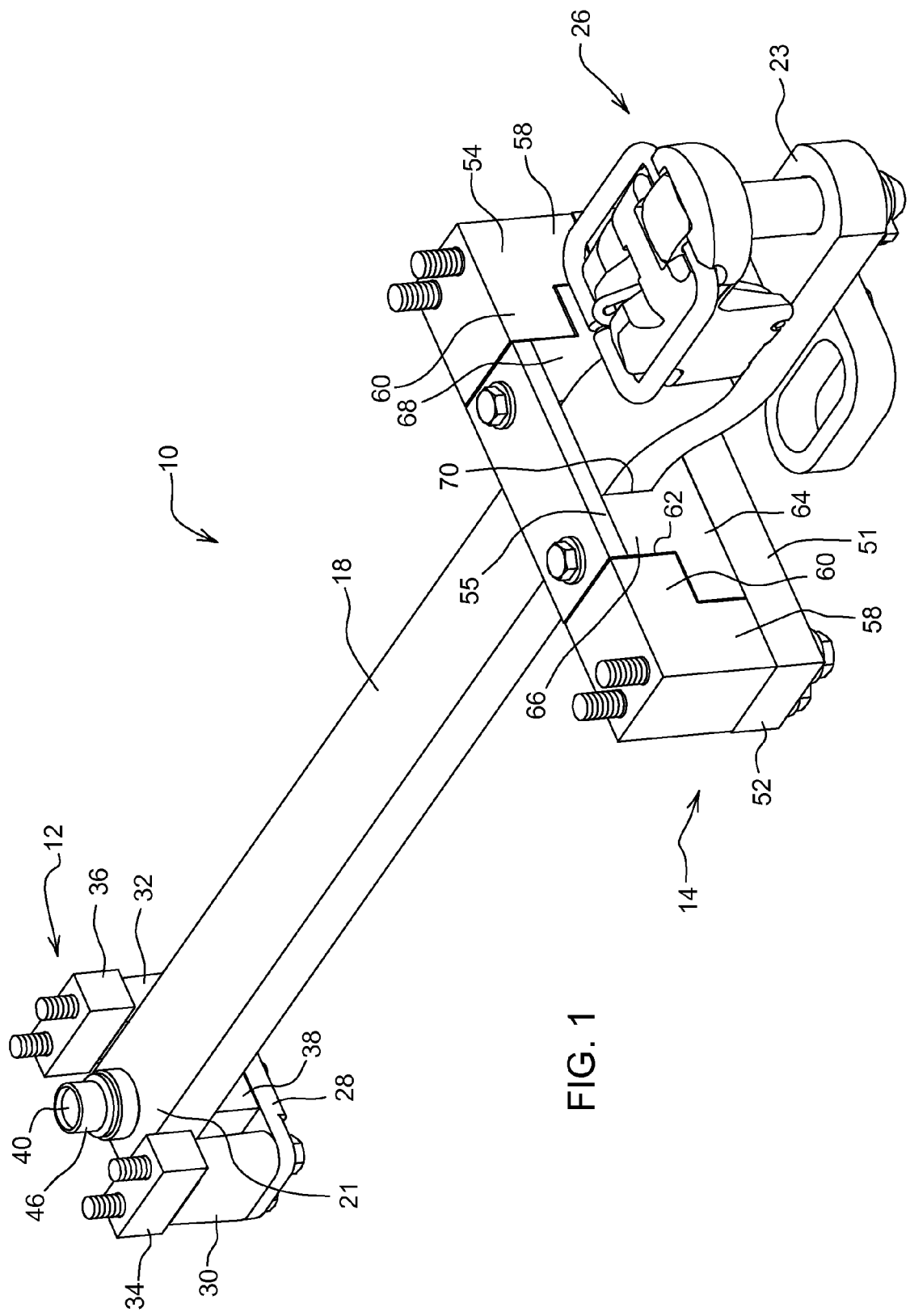
FIG. 1 is a perspective view of a drawbar support assembly according to the present invention, including a drawbar with a clevis-type coupler.
Figure 2:
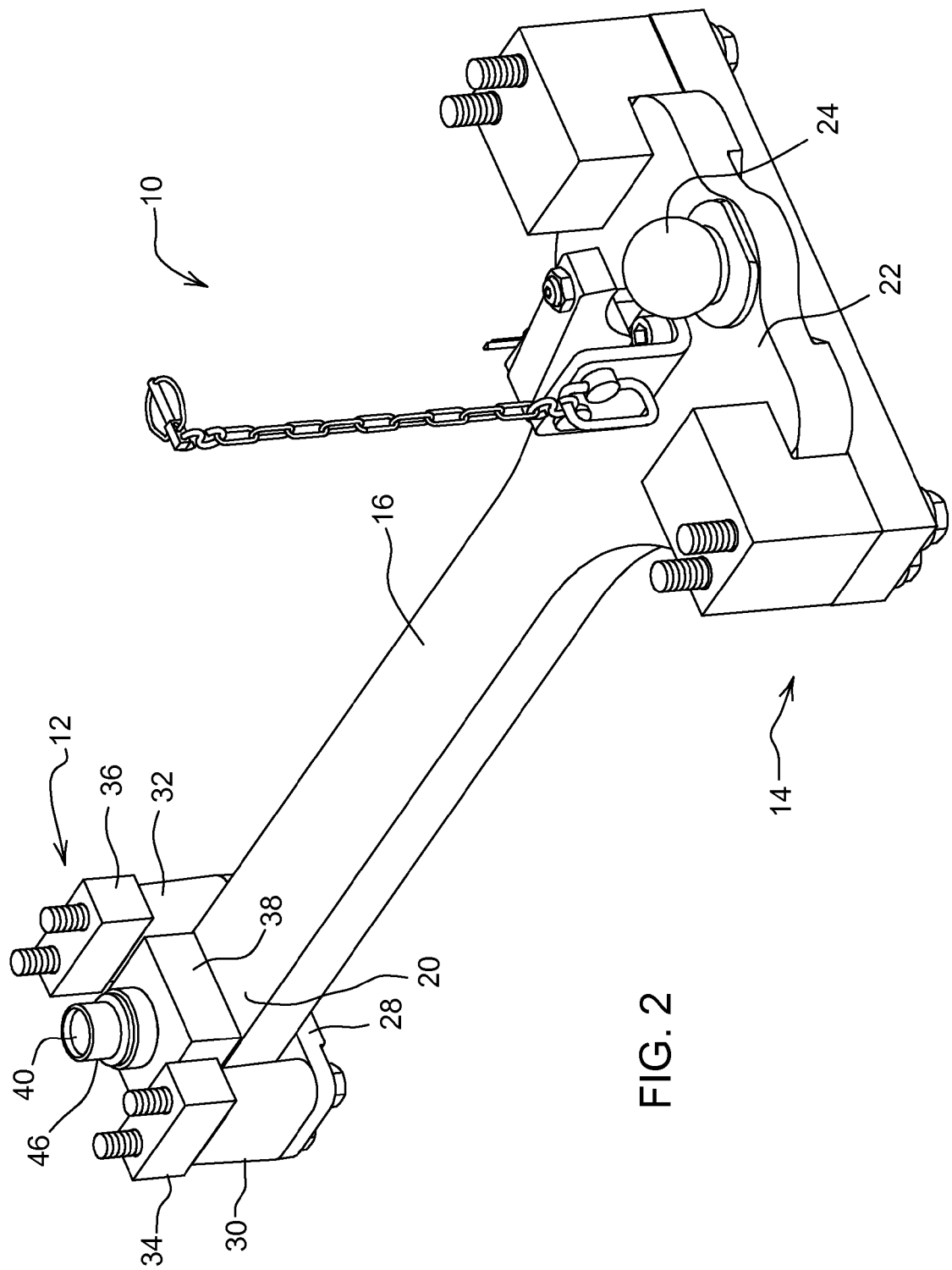
FIG. 2 is a perspective view of a drawbar support assembly according to the present invention, including a drawbar with a ball-type coupler.

Referring to FIGS. 1 and 2, an adaptable drawbar support assembly 10 includes a front support 12 and a rear support 14 for coupling to and supporting various drawbars, such as drawbars 16 or 18. The front support 12 and the rear support 14 are preferably bolted to the underside of a vehicle such as a tractor (not shown). Each drawbar 16, 18 extends from a front end 20, 21 to a rear end 22, 23. The rear end 22 of drawbar 16 can be attached to ball-type implement coupling mechanism 24. The rear end of drawbar 18 can be attached to a clevis-type implement coupling mechanism 26.

Figure 3:
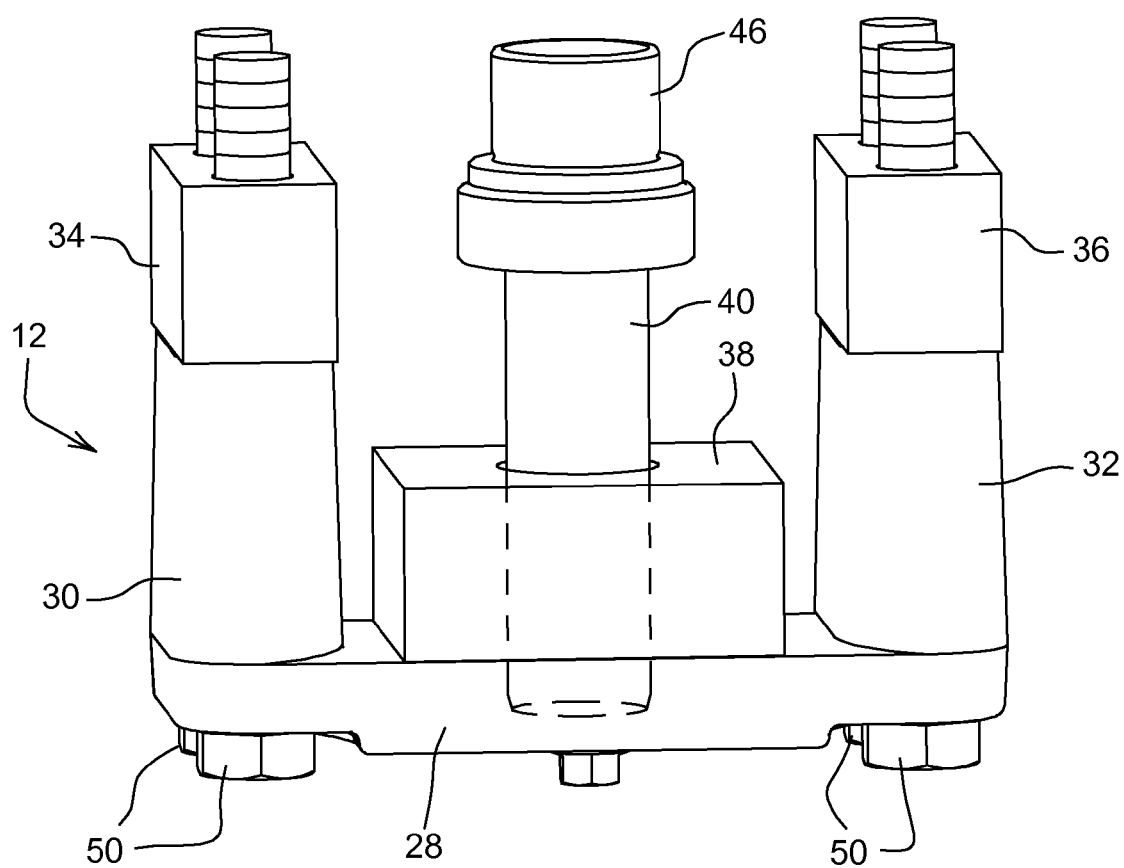
FIG. 3 is a perspective view from above of the front support portion of the drawbar support assembly of FIG. 1.
Figure 4:
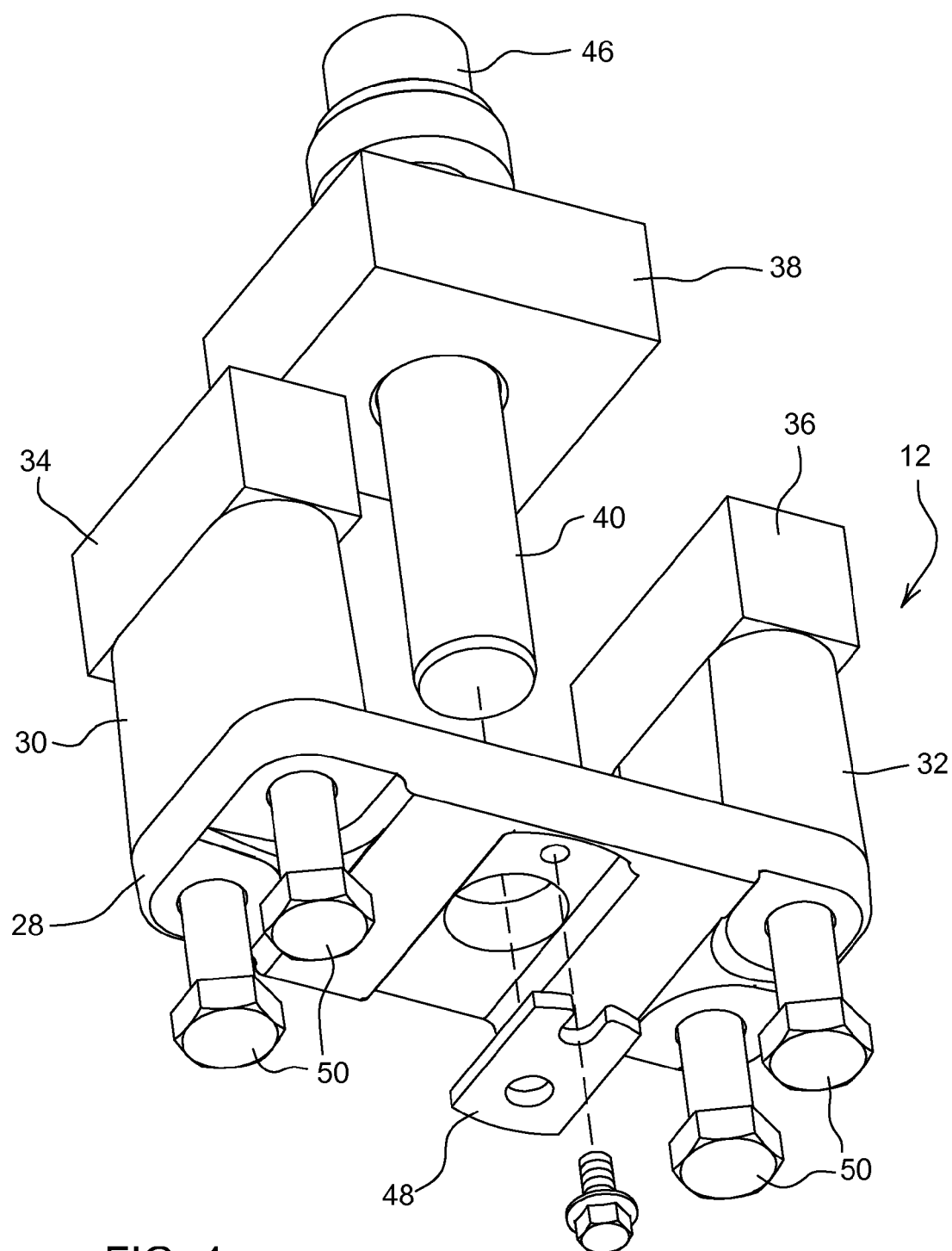
FIG. 4 is a perspective view from below of the front support portion of the drawbar support assembly of FIG. 1.

As best seen in FIG. 3, the front support 12 is generally U-shaped and includes a front support plate 28, a pair of front support posts 30 and 32, a pair of spacers 34 and 36 and a movable front spacer member 38. A pivot pin 40 extends through pivot pin bores in the front spacer member 38, the front ends of drawbars 16 and 18 and plate 28, and into a bushing 46 which is mounted to the underside of the tractor frame (not shown). As a result, the plate 28 supports the front end of the drawbar and is pivotally coupled to the drawbar. The front spacer member 38 may be mounted in the front support 12 either above the front end of the drawbar 16 (as best seen in FIG. 2), or below the front end of the drawbar 18 and between drawbar 18 and the plate 28 (as best seen in FIG. 1). As best seen in FIG. 4, a retainer plate 48 is bolted to the bottom side of plate 28 to prevent pin 40 from sliding down through the pivot pin bore in plate 28. Bolts 50 attach the front support 12 to a tractor frame member (not shown).

Referring again to FIG. 1, the rear support 14 is also generally U-shaped and includes a rear support plate 51, a pair of L-shaped rear support posts 52 and 54, and a rear spacer 55. Plate 51 includes a plurality of paced apart pin bores 56. Each of the posts 52 and 54 includes a downward extending leg 58 and a leg 60 which projects inwardly from an upper end of leg 58. As a result, the rear support forms an inverted T-shaped opening or slot 62. Rear spacer 55 includes a base 64 and a pair of blocks 66 and 68 which project upwardly from the base 64 and which are spaced apart laterally from each other. The blocks 66, 68 form an upwardly opening slot 70. The rear spacer 55 may be mounted in the slot 62 so that base 64 is below drawbar 18 and between drawbar 18 and plate 51.

Alternatively, as best seen in FIG. 2, the rear spacer 55 may be removed from the slot 62 so that drawbar 16 can be supported by the rear support 14 with the bottom of drawbar 16 resting directly on the upper surface of rear support plate 51.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An adaptable drawbar support assembly, comprising:
a drawbar extending from a front end to a rear end, the rear end being attachable to a selected one of a plurality of different implement coupling mechanisms;
a generally U-shaped front support member for coupling to and supporting the front end of the drawbar;
a movable front spacer member, the front spacer member being mountable below the drawbar and between the drawbar and the front support member, and the front spacer member being mountable above the front end of the drawbar;
a generally U-shaped rear support member for coupling to and supporting the drawbar; and
a removable rear spacer member, the rear spacer member being mountable in the rear support member below the drawbar, the rear spacer member being removable from the rear support member when the front spacer member is mounted above the front end of the drawbar.

2. The adaptable drawbar support assembly of claim 1, wherein:
a clevis coupler is attached to the rear end of the drawbar when the front spacer member is mounted below the front end of the drawbar.

3. An adaptable drawbar support assembly adapted for supporting a selected one of a plurality of different drawbars, comprising:
a generally U-shaped front support member adapted for coupling to and supporting a front end of the selected drawbar;
a movable front spacer member, the front spacer member being mountable below the selected drawbar and between the front support member and the drawbar, and being mountable above a different selected drawbar;
a generally U-shaped rear support member for coupling to and supporting the drawbar; and
a removable rear spacer member, the rear spacer member being mountable in the rear support member below the drawbar, the rear spacer member being removable from the rear support member when the front spacer member is mounted above the different selected drawbar.

4. The adaptable drawbar support assembly of claim 3, wherein:
a clevis coupler is attached to the rear end of the selected drawbar when the front spacer member is mounted below the front end of the selected drawbar.

5. An adaptable drawbar support assembly, comprising:
a drawbar extending from a front end to a rear end, the rear end being attachable to a selected one of a plurality of different implement coupling mechanisms;
a generally U-shaped front support member for coupling to and supporting the front end of the drawbar;
a front spacer member mounted in the front support member above or below the front end of the drawbar;
a generally U-shaped rear support member for coupling to and supporting the drawbar; and
a rear spacer member mounted in the rear support member below the drawbar, the rear spacer member being removable from the rear support member when the front spacer member is mounted above the front end of the drawbar, the rear support member forming an inverted T-shaped opening which is substantially filled when the rear spacer member and the drawbar are received therein.

6. An adaptable drawbar support assembly, comprising:
a drawbar extending from a front end to a rear end, the rear end being attachable to a selected one of a plurality of different implement coupling mechanisms;
a generally U-shaped front support member for coupling to and supporting the front end of the drawbar;
a movable front spacer member, the front spacer member being mountable below the drawbar and between the drawbar and the front support member, and the front spacer member being mountable above the front end of the drawbar;
a generally U-shaped rear support member for coupling to and supporting the drawbar; and
a removable rear spacer member, the rear spacer member being mountable in the rear support member below the drawbar, the rear spacer member being removable from the rear support member when the front spacer member is mounted above the front end of the drawbar, the rear support member forming an inverted T-shaped opening which is substantially filled when the rear spacer member and the drawbar are received therein.

7. The adaptable drawbar support assembly of claim 6, wherein:
a clevis coupler is attached to the rear end of the drawbar when the front spacer member is mounted below the front end of the drawbar.

* * * * *